(No Model.)
S. KETHLEDGE.
SCALE BEAM.
No. 448,437. Patented Mar. 17, 1891.
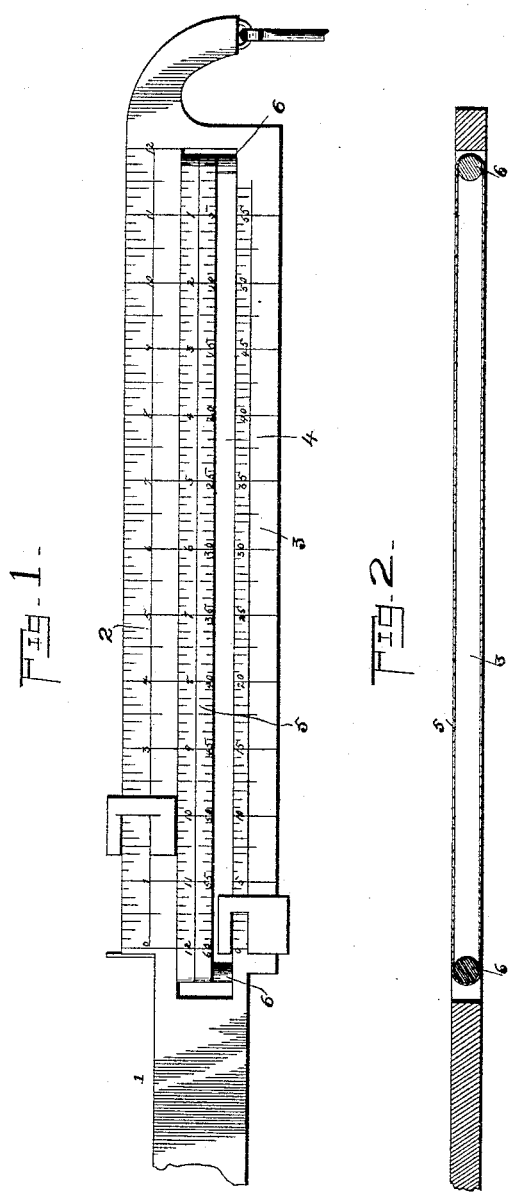
Witnesses
E. S. Duvall Jr.
H. T. Riley
Inventor
Seth Kethledge,
By his Attorneys,
C. A. Snow & Co.

UNITED STATES PATENT OFFICE.

SETH KETHLEDGE, OF NORFOLK, NEBRASKA.

SCALE-BEAM.

SPECIFICATION forming part of Letters Patent No. 448,437, dated March 17, 1891.

Application filed August 1, 1890. Serial No. 360,620. (No model.)

*To all whom it may concern:*

Be it known that I, SETH KETHLEDGE, a citizen of the United States, residing at Norfolk, in the county of Madison and State of Nebraska, have invented a new and useful Scale-Beam, of which the following is a specification.

The invention relates to improvements in scale-beams.

The object of the present invention is to provide an attachment for scale-beams adapted to readily indicate, without necessitating subtraction, the net weight after the gross weight and tare have been obtained.

The invention consists in the construction and novel combination and arrangement of parts hereinafter fully described, illustrated in the accompanying drawings, and pointed out in the claim hereto appended.

In the drawings, Figure 1 is a side elevation of a scale-beam provided with an attachment constructed in accordance with this invention. Fig. 2 is a horizontal sectional view.

Referring to the accompanying drawings, 1 designates a scale-beam constructed and operating in the usual manner, and provided with upper and lower scale-bars 2 and 3, and having a longitudinal opening 4 between them, in which opening is arranged an adjustable scale or measure 5, provided with graduations at its upper and lower edges similar to the adjacent graduations of the scale-beam, but reversely arranged, whereby when the gross weight is obtained in the usual manner and then indicated upon the measure at the 0-point of the scale-beam and the tare is expressed upon the scale-beam the point on the measure opposite the point indicating the tare will indicate the net weight. The measure 5 consists of an endless band mounted upon vertical rollers 6, journaled between the bars of the scale-beam at the ends of the opening 4, and the measure is adapted to be adjusted along the rollers to bring the number equal to the gross weight at the inner end of the beam adjacent to the 0-point.

The operation of the device is as follows: The gross weight or entire weight of a cask and its contents is obtained in the usual manner, and then this amount is indicated upon the measure 5 by bringing that number on the said measure opposite the 0-mark of the scale-beam—say, for instance, the number of pounds is twelve, as illustrated in Fig. 1 of the accompanying drawings. Then the contents of the cask are removed and the cask itself is weighed to ascertain the tare, which, say, for instance, is two pounds, as illustrated in Fig. 1 of the accompanying drawings, and it will readily be seen that the point on the measure opposite the mark 2 of the scale-beam is 10, which is the net weight, which is indicated without requiring subtraction.

It will readily be seen that the attachment is simple and inexpensive in construction and may be readily applied to scale-beams and will indicate the net weight without necessitating calculation on the part of the operator.

What I claim is—

The combination, with a scale-beam having a pair of graduated bars forming a continuous longitudinal opening 4 and the two sliding weights arranged on the bars, of the rollers journaled in the opening at the ends thereof and the endless band or measure arranged upon the rollers and within said opening and provided with a double set of graduations, substantially as described.

In testimony that I claim the foregoing as my own I have hereto affixed my signature in presence of two witnesses.

SETH KETHLEDGE.

Witnesses:
R. A. BATTE,
W. H. PECK.